US008547415B2

(12) United States Patent
Edet

(10) Patent No.: US 8,547,415 B2
(45) Date of Patent: Oct. 1, 2013

(54) METHOD, DEVICE, AND COMPUTER-READABLE MEDIUM FOR ESTABLISHING SIMULTANEOUS INCOMING INTEGRATED SERVICES DIGITAL NETWORK CALLS

(75) Inventor: Nicolas Edet, London (GB)

(73) Assignee: Cisco Technology, Inc., San Jose, CA (US)

( * ) Notice: Subject to any disclaimer, the term of this patent is extended or adjusted under 35 U.S.C. 154(b) by 752 days.

(21) Appl. No.: 12/767,262

(22) Filed: Apr. 26, 2010

(65) Prior Publication Data

US 2010/0277565 A1    Nov. 4, 2010

Related U.S. Application Data

(60) Provisional application No. 61/173,819, filed on Apr. 29, 2009.

(30) Foreign Application Priority Data

Jun. 24, 2009 (NO) .................................. 20092408

(51) Int. Cl.
*H04N 7/14* (2006.01)
(52) U.S. Cl.
USPC ....................... 348/14.08; 348/14.11; 370/260

(58) Field of Classification Search
USPC ................... 348/14.01–14.16; 370/229–240, 370/259–271, 310–358, 395.1–427, 431, 370/464–546; 709/201–207, 217–248
See application file for complete search history.

(56) References Cited

U.S. PATENT DOCUMENTS

| | | | | | |
|---|---|---|---|---|---|
| 5,479,402 | A | * | 12/1995 | Hata et al. | 370/397 |
| 7,227,849 | B1 | * | 6/2007 | Rasanen | 370/329 |
| 7,460,536 | B1 | * | 12/2008 | Williams et al. | 370/392 |
| 7,561,536 | B2 | * | 7/2009 | Roundy et al. | 370/261 |
| 2002/0172152 | A1 | * | 11/2002 | Shiokawa et al. | 370/218 |
| 2004/0114031 | A1 | | 6/2004 | Roundy et al. | |
| 2004/0114625 | A1 | | 6/2004 | Roundy et al. | |

OTHER PUBLICATIONS

Extended European Search Report Issued Oct. 11, 2012 in Patent Application No. 10770000.7.

* cited by examiner

*Primary Examiner* — Hemant Patel
(74) *Attorney, Agent, or Firm* — Oblon, Spivak, McClelland, Maier & Neustadt, L.L.P.

(57) ABSTRACT

A method, device, and computer-readable medium for establishing simultaneous incoming connections from at least two remote video conferencing endpoints using a video conferencing device in a circuit switched network, the video conference device receiving calls on a first protocol layer from the at least two remote video conferencing endpoints.

13 Claims, 4 Drawing Sheets

METHOD, DEVICE, AND COMPUTER-READABLE MEDIUM FOR ESTABLISHING SIMULTANEOUS INCOMING INTEGRATED SERVICES DIGITAL NETWORK CALLS

CROSS-REFERENCE TO RELATED APPLICATIONS

The present application claims the benefit under 35 U.S.C. §119 from U.S. Provisional Application No. 61/173,819, filed Apr. 29, 2009, and claims priority to Norwegian Patent Application No. 20092408, filed Jun. 24, 2009, which are both herein incorporated by reference in their entirety.

BACKGROUND

1. Technological Field

The present disclosure relates to video calls, in particular to an Integrated Services Digital Network (ISDN) device capable of handling multiple video calls.

2. Description of the Related Art

The H.320 standard from the International Telecommunications Union (ITU) is a common standard for multimedia communications over circuit switched networks, such as the Integrated Services Digital Network (ISDN). H.320 is an umbrella standard with several sub standards defining the different protocol layers. For example, H.221 is the framing protocol of H.320. Since video calls require more bandwidth than a single ISDN channel, several channels are set up to make a combined higher bandwidth communication link. The channels making up such a communication link are conventionally called Master Call and Sub-Calls. The Master Call is the first channel to be established, while the Sub-Calls are the subsequent channels to be established. The Master Call and the Sub-Calls are all dialed independently of each other, from the "calling" endpoint to the "called" endpoint.

The H.221 Aggregation protocol defines directly sending H.221 frames in each channel. These frames provide a Sub-Call identifier (channel number, n) for each channel participating in a point-to-point video call. However, if a receiving endpoint receives video calls from several transmitting endpoints, it is not possible to identify which Sub-Calls belong to which connection. As the receiving endpoint cannot reliably recreate the communication links, the receiving end will drop Sub-Calls or entire connections altogether.

One possible solution may be for the receiving endpoint to only accept one incoming connection at a time. In this case, the endpoint needs to immediately drop channels with a Sub-Call Identifier n=1 (indicating a new Master Call) until all the Sub-Calls have been established for the current incoming connection. This would provide a poor user experience, forcing callers to dial again until their connection gets accepted.

Another possible solution may be using the Calling Number information sometimes available from the call control layer (ITU Recommendation Q.931 protocol), and considering all ISDN channels with identical Calling Numbers being part of the same connection. However, the provision of this information relies on optional supplementary services (i.e., Calling Line Identification Presentation (CLIP)) which may not be available, this information may be hidden (Calling Line Identification Restriction (CLIR)), and networks may modify or strip this information. Furthermore, different connections may have identical Calling Numbers (e.g., multiple connections from a Gateway to another Gateway), or Calling Numbers within one connection may be different (e.g., ISDN channels spanning different Primary Rate Interfaces (PRIs)).

Another possible solution is the BONDING™ protocol, of the BONDING™ consortium, which solves the problem by sending a Connection Identifier (the Group ID) as well as a Sub-Call Identifier (the channel ID), in-band, within each ISDN channel. The Connection Identifiers are allocated by the receiving endpoint, and kept unique across all incoming connections. Each calling endpoint transmits its own Connection Identifier within each of its Sub-Calls, to allow the receiving endpoint to identify which ISDN channels are used by remote endpoints. The Sub-Call Identifiers, all different within a given connection, are used by the receiving endpoint to reorder the ISDN channels. This technique, therefore, provides an ISDN endpoint (capable of handling multiple connections), or an ISDN Gateway, the ability to receive simultaneous incoming BONDING™ connections. FIG. 1 illustrates two remote endpoints, Endpoint A 100 and Endpoint B 110, which are calling a Gateway 130 across an ISDN network 120. In FIG. 1, the first digit (of the x/x identifiers) represents the Connection Identifier, and the second digit represents the Sub-Call Identifier sent within each ISDN channel.

However the BONDING™ protocol may not be supported by older endpoints. The BONDING™ protocol requires all channels that are part of a connection to be synchronized before media can be conveyed. However, the H.221 Aggregation protocol allows media to be conveyed while new ISDN channels are still being added to a connection.

SUMMARY

A method, device, and computer-readable medium for establishing simultaneous incoming connections from at least two remote video conferencing endpoints using a video conferencing device in a circuit switched network, the video conference device receiving calls on a first protocol layer from the at least two remote video conferencing endpoints. The method receives, on a second protocol layer, at least one sub-call having a sub-call ID; determines the sub-call ID of the at least one sub-call; in response to the sub-call ID identifying the at least one sub-call as a master sub-call, maps a connection ID with a remote video conferencing endpoint of the at least two remote video conferencing endpoints transmitting the master sub-call, adds the connection ID to a queue of remote video conferencing endpoints from which to expect another sub-call, and transmits framing on the at least one sub-call; in response to the sub-call ID not identifying the at least one sub-call as a master sub-call, retrieves the connection ID corresponding to the remote video conferencing endpoint, checks the queue whether the sub-call ID is already expected on another connection ID, adds the at least one sub-call to the queue of expected sub-calls in response to the sub-call ID already being expected on another connection ID, and transmits framing on the at least one sub-call and removing the at least one sub-call from the queue of expected sub-calls in response to the sub-call ID not already being expected on another connection ID.

As should be apparent, a number of advantageous features and benefits are available by way of the disclosed embodiments and extensions thereof. It is to be understood that any embodiment can be constructed to include one or more features or benefits of embodiments disclosed herein, but not others. Accordingly, it is to be understood that the embodiments discussed herein are provided as examples and are not to be construed as limiting, particularly since embodiments can be formed to practice the invention that do not include each of the features of the disclosed examples.

BRIEF DESCRIPTION OF THE DRAWINGS

The disclosure will be better understood from reading the description which follows and from examining the accompanying figures. These are provided solely as non-limiting examples of embodiments. In the drawings.

DETAILED DESCRIPTION

In the following detailed description of the method, device, and computer-readable medium according to the present disclosure, an Integrated Services Digital Network (ISDN) endpoint or gateway implementing the method, will be denoted a gateway, while any ISDN endpoint or gateway making a call to the device implementing the method will be denoted an endpoint.

According to the present disclosure, an ISDN endpoint or gateway establishes simultaneous incoming connections by controlling the order in which remote endpoints send framing on each Sub-Call. By delaying the transmitting of framing on certain Sub-Calls, the endpoint receiving the calls ensures that one remote endpoint starts transmitting framing with a new Sub-Call ID at any time, thus forcing endpoints to start transmitting framing in a known sequential order, thereby allowing the receiving endpoint to keep track of which connection a given Sub-Call belongs.

Figure 1:
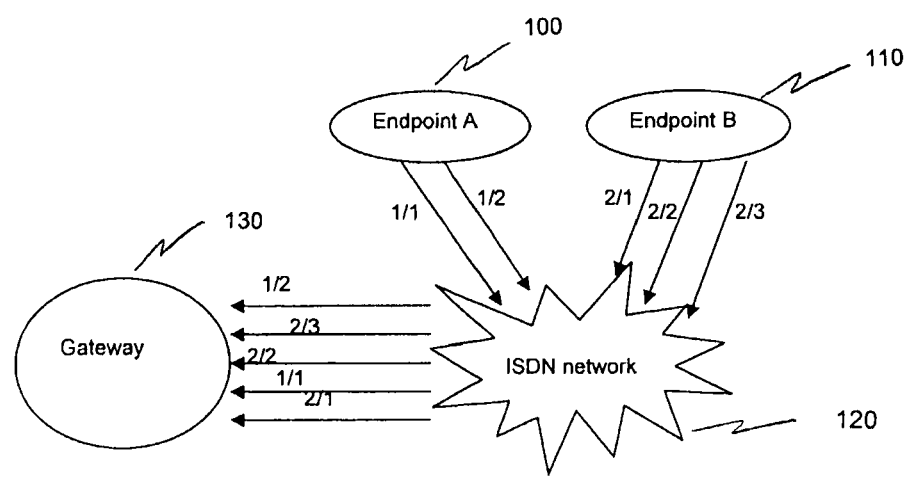
FIG. 1 shows an embodiment of a conventional system using the BONDING™ protocol.
Figure 2:
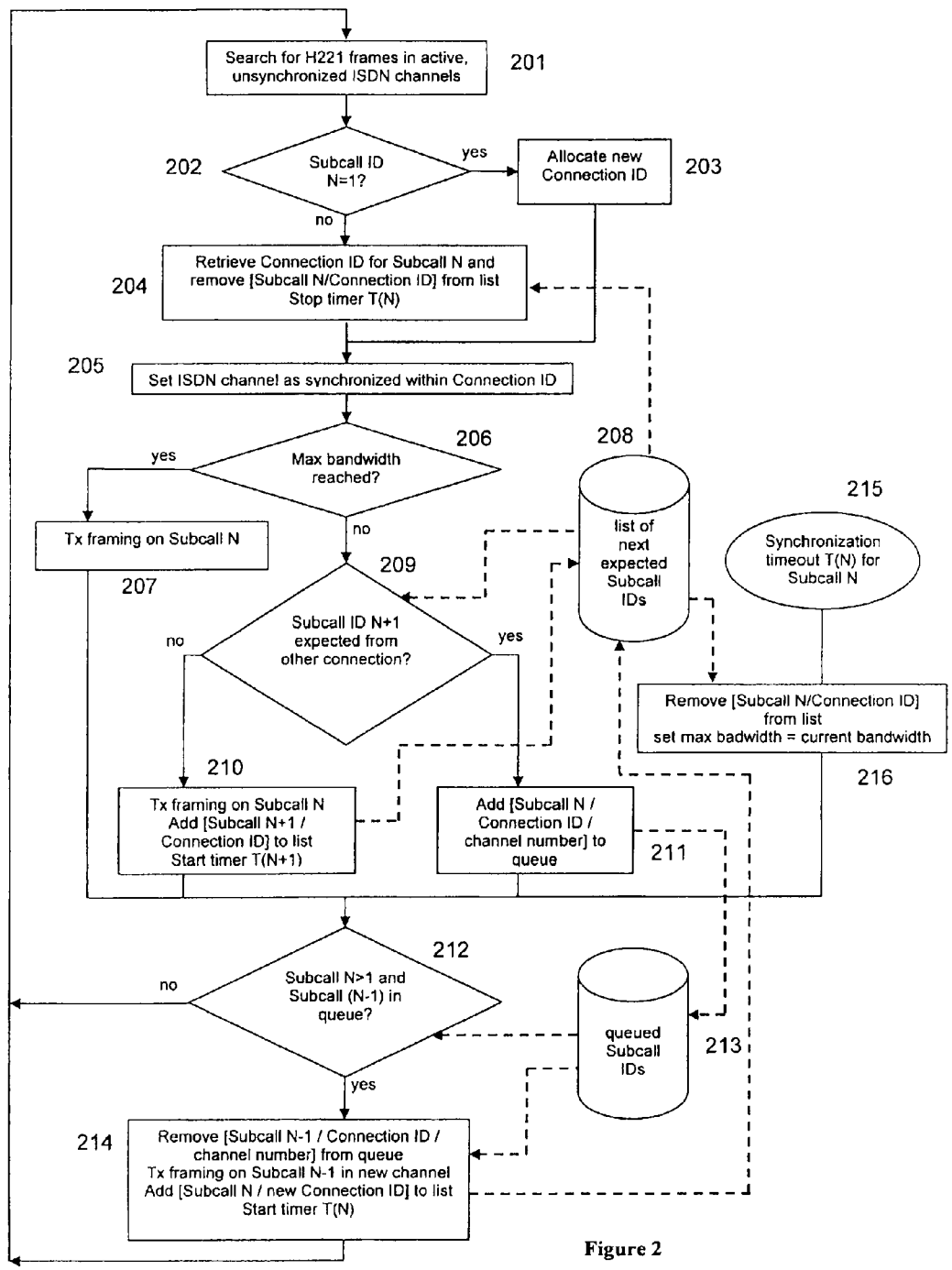
FIG. 2 is a flow diagram illustrating the method according to one embodiment of the present disclosure.

Endpoints transmit framing on Sub-Call ID (n+1), by way of a transmitter, and receive framing on Sub-Call (n) from the gateway, by way of a receiver. Alternatively, the transmitting and receiving may be performed by a transceiver. Thus, the gateway can keep a list of expected Sub-Call IDs to be received next, knowing that transmitting framing on Sub-Call ID (n) to a certain endpoint will trigger the endpoint to start transmitting framing on the next Sub-Call ID (n+1) on a new ISDN channel. Once framing on Sub-Call ID (n+1) has been received from the expected endpoint, the gateway sets the new channel as being used by the endpoint, thereby allowing another calling endpoint to transmit framing on Sub-Call ID (n+1). This method will be described in further detail below with reference to FIG. 2.

The method starts with at least one remote endpoint setting up an H.320 call to the gateway using the appropriate control layers of the H.320 protocol, leading to at least one active ISDN channel. All incoming calls are answered immediately by the gateway to avoid no-answer timeouts. Then, referring to FIG. 2, the gateway searches for H.221 frames transmitted from all endpoints in the active channels (step 201). If in step 202 a received H.221 frame is found to have a Sub-Call ID (n=1), indicating a Master Call, the method continues to step 203, otherwise the method continues to step 204.

In step 203 the gateway allocates internal resources to accept a new incoming connection. The internal resources include a unique Internal Connection Identifier defining the remote calling endpoint. In step 204, the gateway uses the Sub-Call ID (n) to look up the connection ID from the list of expected Sub-Call IDs in the internal memory 208, and removes the entry [Sub-Call ID (n)/Connection ID] from the list.

Then, in step 205, the ISDN channel in which framing was found is set as being synchronized within the Connection ID. This channel is now considered part of the communication link between the gateway and the remote endpoint defined by the Connection ID.

In step 206, if the maximum bandwidth to the connection is known, the gateway determines whether or not that bandwidth has been reached when the new channel is added to the connection. If the maximum bandwidth is reached, the gateway starts transmitting framing on Sub-Call ID (n) (step 207) and continues to step 212. This minimizes cases where framing is not received on certain Sub-Calls, which delays Sub-Call establishment to other connections. However, if the maximum bandwidth to the connection is not known or has not yet been reached, the method continues to step 209.

In step 209, the gateway checks, by way of a processor, through the list of next expected Sub-Call IDs in the internal memory 208 to determine whether a Sub-Call having Sub-Call ID (n+1) is already expected from another connection. If so, the gateway proceeds to step 211, wherein the current Sub-Call ID (n), Internal Connection ID, and ISDN channel number are added to a queue of Sub-Call IDs stored in the internal memory 213, i.e., [Sub-Call ID (n)/Connection 1D/channel number]. If a Sub-Call ID (n+1) is not expected from another connection, the gateway starts transmitting framing on Sub-Call ID (n) in the current channel, and stores the next expected Sub-Call ID (n+1) along with this Connection ID, in the list of next expected Sub-Calls in the internal memory 208 (step 210).

At this stage, the gateway is either transmitting framing on Sub-Call ID (n) for the current Connection ID, or has delayed transmitting framing and added [Sub-Call ID (n)/Connection ID/channel number] in a queue. Then, if the current call is not a Master Call (i.e., n>1) the gateway reads the queue of Sub-Call IDs stored in the internal memory 213 to check whether a Sub-Call with Sub-Call ID (n−1) exists in the queue (step 212). If so, the gateway retrieves the corresponding new Connection ID and new ISDN channel number and removes [Sub-Call ID (n−1)/Connection ID/channel number] from the queue, starts transmitting framing on Sub-Call ID (n−1) in the new channel, and stores the next expected Sub-Call ID (n) along with the new Connection ID in the list of next expected Sub-Calls in the internal memory 208 (step 214). Thereafter, the gateway returns to searching for H.221 frames in step 201. If, however, no Sub-Call ID (n−1) exists in the queue, or the current call is a Master Call, the gateway immediately returns to searching for H.221 frames in step 201.

The gateway waits to receive H.221 frames with a new Sub-Call ID within a connection for a pre-defined period of time. If no new Sub-Call ID is received after the pre-defined period of time, the gateway invokes the synchronization timeout procedure (step 215). To measure the synchronization time for a Sub-Call ID (n), timer T(n) is started in steps 210 and 214, and stopped in step 204.

The synchronization timeout procedure 215 is invoked for a Sub-Call ID (n) when the gateway has waited for framing from that Sub-Call over a pre-defined period of time, and timer T(n) expired. Then, [Sub-Call ID (n)/Connection ID] is removed from the list of next expected Sub-Calls in the internal memory 208, and the maximum bandwidth for that connection is set to the current bandwidth to ensure the remote endpoint does not initiate Sub-Call ID (n) at a later stage (step 216). The method then continues to step 212.

Figure 3:
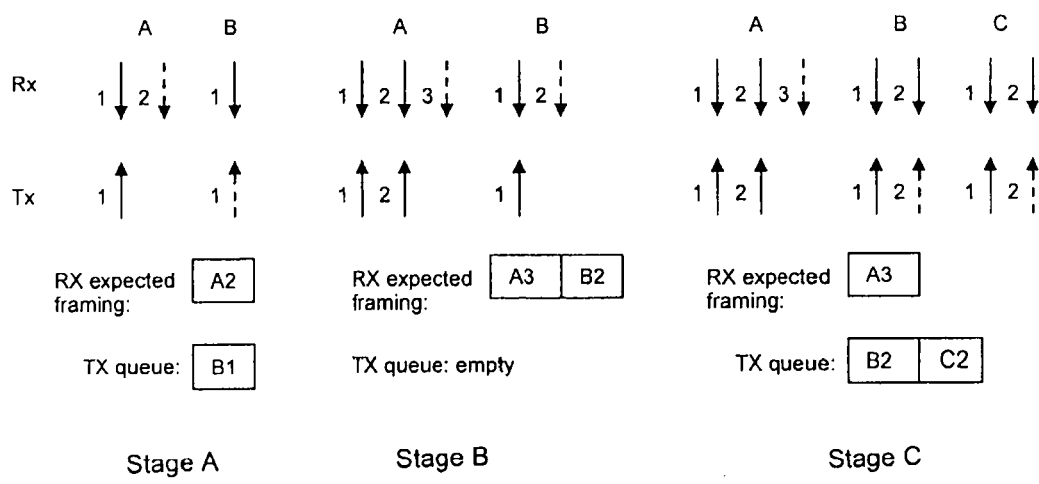
FIG. 3 shows an exemplary embodiment of establishing simultaneous calls according to the present disclosure.

FIG. 3 shows an exemplary embodiment of simultaneous calls, wherein an ISDN Gateway (GW) receives simultaneous calls from three remote endpoints A, B, and C. The 'Rx' solid arrows denote framing received by the gateway (along with the Sub-Call identifiers), while the 'Rx' dashed arrows represent framing which is expected to be received next. The 'Tx' solid arrows denote framing transmitted by the gateway while the 'Tx' dashed arrows represent framing being queued, which is expected to be transmitted at a later time.

Endpoints A and B may simultaneously initiate a new connection to the gateway. Framing on the two Master Calls is received at the gateway. The gateway starts transmitting framing on endpoint A's Master Call, thus expecting to receive framing next from A on Sub-Call 2. However, the GW cannot transmit framing on the Master Call to B, since that would lead to B transmitting framing on Sub-Call 2 at the same time as A. Thus, B1 is added to the transmit (Tx) queue (stage A).

In stage B of FIG. 3, the gateway has received framing on Sub-Call 2 from A. The gateway then starts transmitting framing on Sub-Call 2 and expects receiving framing on Sub-Call 3. The gateway also checks its queue to find that it can transmit framing on Sub-Call 1 to B, since no other connection currently expects to receive any framing on Sub-Call 2.

In stage C, the gateway has received framing on Sub-Call 2 from B, and endpoint C initiates a new connection. The gateway can transmit framing on the Master Call to C, but cannot transmit framing on Sub-Call 2 to B or C, until framing has been received (or a timeout occurs) on Sub-Call 3 from A. This procedure continues until the desired number of channels are connected to each endpoint.

Figure 4:
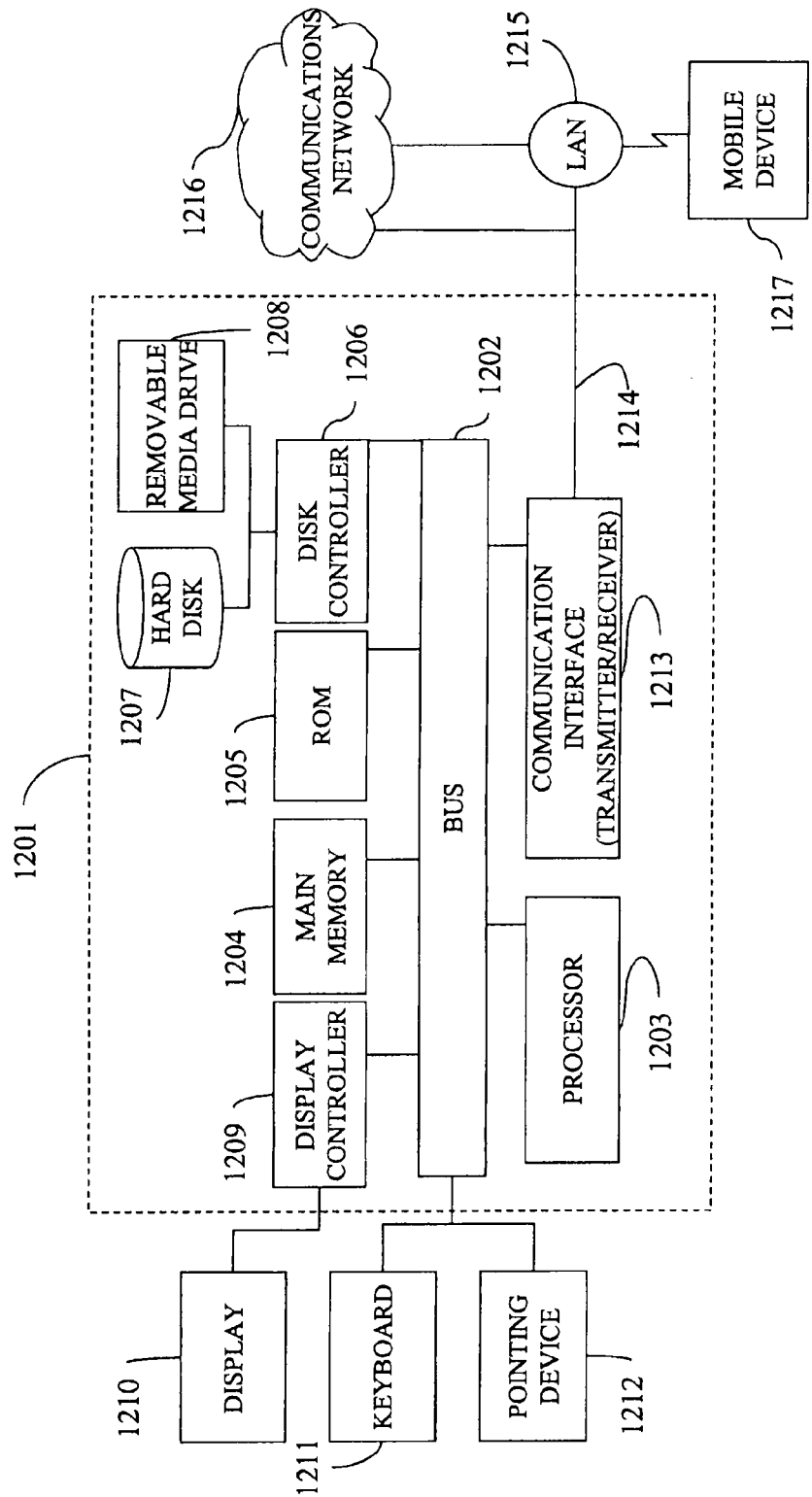
FIG. 4 illustrates a computer system upon which an embodiment of the present disclosure may be implemented.

FIG. 4 illustrates a computer system 1201 upon which an embodiment of the present disclosure may be implemented. The computer system 1201, for example, may include various components of the video conferencing device, such as, but not limited to, the transmitter, the receiver, the processor, or the like. The computer system 1201 includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as the touch panel display 101 or a liquid crystal display (LCD), for displaying information to a computer user. The computer system includes input devices, such as a keyboard 1211 and a pointing device 1212, for interacting with a computer user and providing information to the processor 1203. The pointing device 1212, for example, may be a mouse, a trackball, a finger for a touch screen sensor, or a pointing stick for communicating direction information and command selections to the processor 1203 and for controlling cursor movement on the display 1210.

The computer system 1201 performs a portion or all of the processing steps of the present disclosure in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One, or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the present disclosure and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes.

Stored on any one or on a combination of computer readable media, the present disclosure includes software for controlling the computer system 1201, for driving a device or devices for implementing the invention, and for enabling the computer system 1201 to interact with a human user. Such software may include, but is not limited to, device drivers, operating systems, and applications software. Such computer readable media further includes the computer program product of the present disclosure for performing all or a portion (if processing is distributed) of the processing performed in implementing the invention.

The computer code devices of the present embodiments may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any non-transitory medium that participates in providing instructions to the processor 1203 for execution. A computer readable medium may take many forms, including but not limited to, non-volatile media or volatile media. Non-volatile media includes, for example, optical, magnetic disks, and magneto-optical disks, such as the hard disk 1207 or the removable media drive 1208. Volatile media includes dynamic memory, such as the main memory 1204. Transmission media, on the contrary, includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the computer system 1201 may receive the data on the telephone line and place the data on the bus 1202.

The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 may include the transmitter, the receiver, or both (i.e., a transceiver), of the present disclosure. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an integrated services digital network (ISDN) card. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc.). The signals through the various networks and the signals on the network link 1214 and through the communication interface 1213, which carry the digital data to and from the computer system 1201 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

Further, it should be appreciated that the exemplary embodiments of the present disclosure are not limited to the exemplary embodiments shown and described above. While this invention has been described in conjunction with exemplary embodiments outlined above, various alternatives, modifications, variations and/or improvements, whether known or that are, or may be, presently unforeseen, may become apparent. Accordingly, the exemplary embodiments of the present disclosure, as set forth above are intended to be illustrative, not limiting. The various changes may be made without departing from the spirit and scope of the invention. Therefore, the disclosure is intended to embrace all now known or later-developed alternatives, modifications, variations and/or improvements.

The invention claimed is:

1. A method for establishing simultaneous incoming connections from at least two remote video conferencing endpoints using a video conferencing device in a circuit switched network, the video conference device receiving calls on a first protocol layer from the at least two remote video conferencing endpoints, the method comprising:
   receiving, by the video conferencing device, on a second protocol layer, at least one sub-call having a sub-call ID;
   determining, by the video conferencing device, the sub-call ID of the at least one sub-call;
   in response to the sub-call ID identifying the at least one sub-call as a master sub-call,
      mapping, by the video conferencing device, a connection ID with a remote video conferencing endpoint of the at least two remote video conferencing endpoints transmitting the master sub-call,
      adding, by the video conferencing device, the connection ID to a queue of remote video conferencing endpoints from which to expect another sub-call, and
      transmitting, by the video conferencing device, framing on the at least one sub-call;
   in response to the sub-call ID not identifying the at least one sub-call as a master sub-call,
      retrieving, by the video conferencing device, the connection ID corresponding to the remote video conferencing endpoint,
      checking, by the video conferencing device, the queue whether the sub-call ID is already expected on another connection ID,
      adding, by the video conferencing device, the at least one sub-call to a queue of expected sub-calls in response to the sub-call ID already being expected on another connection ID, and
      transmitting, by the video conferencing device, framing on the at least one sub-call and removing the at least one sub-call from the queue of expected sub-calls in response to the sub-call ID not already being expected on another connection ID.

2. The method according to claim 1, further comprising:
   determining, by the video conferencing device, a maximum available bandwidth to the remote video conferencing endpoint;
   determining, by the video conferencing device, whether the maximum available bandwidth has been reached when a new sub-call is added to a connection;
   transmitting, by the video conferencing device, framing on the new sub-call when the maximum available bandwidth has been reached; and
   waiting, by the video conferencing device, for a new sub-call on a next connection ID in the queue.

3. The method according to claim 2, wherein the maximum available bandwidth is determined as having been reached when a synchronization timer expires.

4. The method according to claim 1, wherein the first protocol is H.320 and the second protocol is H.221.

5. A video conferencing device in a circuit switched network configured to establish simultaneous incoming connections from at least two remote video conferencing endpoints, the video conferencing device comprising:
   a transceiver configured to receive and transmit multiple connections on the circuit switched network, configured to receive calls on a first protocol layer from the at least two remote video conferencing endpoints, and configured to receive, on a second protocol layer, at least one sub-call having a sub-call ID;
a processor configured to determine the sub-call ID of the at least one sub-call;
the processor further configured to, in response to the sub-call ID identifying the at least one sub-call as a master sub-call,
map a connection ID with a remote video conferencing endpoint of the at least two remote video conferencing endpoints transmitting the master sub-call,
add the connection ID to a queue of remote video conferencing endpoints from which to expect another sub-call, and
cause the transceiver to transmit framing on the at least one sub-call;
the processor further configured to, in response to the sub-call ID not identifying the at least one sub-call as a master sub-call,
retrieve the connection ID corresponding to the remote video conferencing endpoint,
check the queue whether the sub-call ID is already expected on another connection ID,
add the at least one sub-call to a queue of expected sub-calls in response to the sub-call ID already being expected on another connection ID, and
cause the transceiver to transmit framing on the at least one sub-call and remove the at least one sub-call from the queue of expected sub-calls in response to the sub-call ID not already being expected on another connection ID; and
a memory configured to store the queue.

6. The video conferencing device according to claim 5, wherein,
the transceiver is further configured to receive at least one connection of the incoming connections on a packet switched network, and
the processor is further configured to translate between the circuit switched network and the packet switched network.

7. The video conferencing device according to claim 5, wherein,
the processor is further configured to determine a maximum available bandwidth to the remote video conferencing endpoint and determine whether the maximum available bandwidth has been reached when a new sub-call is added to a connection, and
the transceiver is further configured to transmit framing on the new sub-call when the maximum available bandwidth has been reached, and wait for a new sub-call on a next connection ID in the queue.

8. The video conferencing device according to claim 7, wherein the maximum available bandwidth is determined as having been reached when a synchronization timer expires.

9. The video conferencing device according to claim 5, wherein the first protocol is H.320 and the second protocol is H.221.

10. A computer-readable storage medium including computer executable instructions, wherein the instructions, when executed by a computer, cause the computer to perform a method for establishing simultaneous incoming connections from at least two remote video conferencing endpoints using a video conferencing device in a circuit switched network, the video conference device receiving calls on a first protocol layer from the at least two remote video conferencing endpoints, the method comprising:
receiving, by the video conferencing device, on a second protocol layer, at least one sub-call having a sub-call ID;
determining, by the video conferencing device, the sub-call ID of the at least one sub-call;
in response to the sub-call ID identifying the at least one sub-call as a master sub-call,
mapping, by the video conferencing device, a connection ID with a remote video conferencing endpoint of the at least two remote video conferencing endpoints transmitting the master sub-call,
adding, by the video conferencing device, the connection ID to a queue of remote video conferencing endpoints from which to expect another sub-call, and
transmitting, by the video conferencing device, framing on the at least one sub-call;
in response to the sub-call ID not identifying the at least one sub-call as a master sub-call,
retrieving, by the video conferencing device, the connection ID corresponding to the remote video conferencing endpoint,
checking, by the video conferencing device, the queue whether the sub-call ID is already expected on another connection ID,
adding, by the video conferencing device, the at least one sub-call to a queue of expected sub-calls in response to the sub-call ID already being expected on another connection ID, and
transmitting, by the video conferencing device, framing on the at least one sub-call and removing the at least one sub-call from the queue of expected sub-calls in response to the sub-call ID not already being expected on another connection ID.

11. The computer-readable storage medium according to claim 10, further comprising:
determining, by the video conferencing device, a maximum available bandwidth to the remote video conferencing endpoint;
determining, by the video conferencing device, whether the maximum available bandwidth has been reached when a new sub-call is added to a connection;
transmitting, by the video conferencing device, framing on the new sub-call when the maximum available bandwidth has been reached; and
waiting, by the video conferencing device, for a new sub-call on a next connection ID in the queue.

12. The computer-readable storage medium according to claim 11, wherein the maximum available bandwidth is determined as having been reached when a synchronization timer expires.

13. The computer-readable storage medium according to claim 10, wherein the first protocol is H.320 and the second protocol is H.221.

* * * * *